United States Patent
Pudipeddi et al.

(10) Patent No.: US 12,505,340 B2
(45) Date of Patent: Dec. 23, 2025

(54) STASH BALANCING IN MODEL PARALLELISM

(71) Applicant: Microsoft Technology Licensing, LLC, Redmond, WA (US)

(72) Inventors: Bharadwaj Pudipeddi, San Jose, CA (US); Juliana Patrícia Vicente Franco, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 701 days.

(21) Appl. No.: 16/940,293

(22) Filed: Jul. 27, 2020

(65) Prior Publication Data

US 2022/0027724 A1 Jan. 27, 2022

(51) Int. Cl.
| | |
|---|---|
| *G06N 3/08* | (2023.01) |
| *G06F 12/06* | (2006.01) |
| *G06N 3/04* | (2023.01) |

(52) U.S. Cl.
CPC ........... *G06N 3/08* (2013.01); *G06F 12/0646* (2013.01); *G06N 3/04* (2013.01); *G06F 2212/251* (2013.01)

(58) Field of Classification Search
CPC ............ G06N 3/08; G06N 3/04; G06N 3/045; G06N 3/063; G06N 3/084; G06F 12/0646; G06F 2212/251; G06T 1/20
See application file for complete search history.

(56) References Cited

U.S. PATENT DOCUMENTS

| | | | | |
|---|---|---|---|---|
| 11,270,196 | B2* | 3/2022 | Sawada | G06N 3/048 |
| 2018/0314671 | A1* | 11/2018 | Zhang | G06N 3/063 |
| 2020/0249996 | A1* | 8/2020 | Kumar Addepalli | G06F 15/76 |
| 2020/0301739 | A1* | 9/2020 | Xu | G06F 9/505 |
| 2020/0349443 | A1* | 11/2020 | Vepakomma | G06N 3/084 |
| 2021/0097366 | A1* | 4/2021 | Wagner | G06F 40/20 |
| 2022/0051471 | A1* | 2/2022 | Logothetis | G06V 10/766 |

FOREIGN PATENT DOCUMENTS

CN 111047026 A 8/2023

OTHER PUBLICATIONS

Ding, Wei, et al. "Designing efficient accelerator of depthwise separable convolutional neural network on FPGA." Journal of Systems Architecture 97 (2019): 278-286. (Year: 2019).*

Del Monte, Bonaventura, and Radu Prodan. "A scalable GPU-enabled framework for training deep neural networks." 2016 2nd International Conference on Green High Performance Computing (ICGHPC). IEEE, 2016. (Year: 2016).*

(Continued)

*Primary Examiner* — Miranda M Huang
*Assistant Examiner* — Sidney Vincent Bostwick
(74) *Attorney, Agent, or Firm* — Holzer Patel Drennan

(57) ABSTRACT

Embodiments of the present disclosure include systems and methods for training neural networks. In one embodiment, data for an artificial intelligence model is processed in a first plurality of stages and in a second plurality of stages. The first and second pluralities of stages form a pipeline. One or more of the first plurality of stages uses at least one memory associated with a corresponding one or more of the second plurality of stages to balance memory across the pipeline.

13 Claims, 10 Drawing Sheets

(56) References Cited

OTHER PUBLICATIONS

Shoeybi, Mohammad, et al. "Megatron-Im: Training multi-billion parameter language models using model parallelism." arXiv preprint arXiv:1909.08053 (2019). (Year: 2019).*

Poirot, Maarten G. Split learning in health care: multi-center deep learning without sharing patient data. MS thesis. University of Twente, 2020. (Year: 2020).*

Rajbhandari, Samyam, et al. "Zero: Memory optimizations toward training trillion parameter models." SC20: International Conference for High Performance Computing, Networking, Storage and Analysis. IEEE, 2020. (Year: 2020).*

Chen, et al., "Training Deep Nets with Sublinear Memory Cost", in Repository of arXiv:1604.06174v1, Apr. 21, 2016, 12 Pages.

Harlap, et al., "PipeDream: Fast and Efficient Pipeline Parallel DNN Training", in Repository of arXiv:1806.03377v1, Jun. 8, 2018, 14 Pages.

Huang, et al., "GPipe: Efficient Training of Giant Neural Networks using Pipeline Parallelism", in Repository of arXiv:1811.06965v1, Nov. 16, 2018, 11 Pages.

"International Search Report and Written Opinion Issued in PCT Application No. PCT/US2021/034687", Mailed Date: Nov. 4, 2021, 13 Pages.

Pudipeddi, et al., "Training Large Neural Networks with Constant Memory using a New Execution Algorithm", in Repository of arXiv:2002.05645v1, Feb. 13, 2020, 11 Pages.

Rajbhandari, et al., "ZeRO: Memory Optimization Towards Training a Trillion Parameter Models", in Repository of arXiv:1910.02054v2, Oct. 7, 2019, 17 Pages.

Shen, et al., "Maximizing CNN Accelerator Efficiency Through Resource Partitioning", in Proceedings of the ACM/IEEE 44th Annual International Symposium on Computer Architecture, Jun. 24, 2017, pp. 535-547.

Wei, et al., "Designing Efficient Accelerator of Depthwise Separable Convolutional Neural Network on FPGA", in Journal of the Systems Architecture, vol. 97, Dec. 28, 2018, pp. 278-286.

First Examination Report Received for Indian Application No. 202347001163, mailed on Aug. 11, 2025, 08 pages.

* cited by examiner

FIG. 4

//<br>
STASH BALANCING IN MODEL PARALLELISM

BACKGROUND

The present disclosure relates to computing, and more particularly to techniques for training a neural network.

Artificial neural networks (hereinafter, neural network) have become increasingly important in artificial intelligence applications and modern computing in general. An example neural network is shown in FIG. 1. The neural network 100 receives input values corresponding to features to be recognized. The input values are multiplied by weights (represented by edges 101) and added together (e.g., summed) in nodes 102. An activation function is applied to the result in the nodes 102 to generate an output value. Values are combined across multiple nodes and layers of nodes to produce network output values corresponding to a result.

Such systems "learn" to perform tasks by considering examples, generally without being programmed with task-specific rules. Initially, the weights may be untrained. During a training phase, input values for corresponding known results are processed by the network, and a difference (or error) between the network output values and the known values is determined. The weights may be adjusted based on the error using a process known as backpropagation, where computations flow through the neural network in the reverse direction (e.g., from the output to the input). Training may involve successively adjusting weights across many input samples and corresponding known network output values. This is often referred to as the training phase. Once trained, the system may receive inputs and produce meaningful results (e.g., classification or recognition). This is often referred to as the inference phase.

Training for very large neural networks may involve a massive number of computations. Additionally, memory usage is a problem with neural networks in general. Neural networks with large depths may be required to store activations for the whole depth of the network. This problem is compounded when the network uses pipelining, which may cause the memory size to increase significantly. In some neural networks, a pipeline may cause the memory size to grow quadratically, for example.

The present disclosure pertains to neural network training techniques that reduce memory usage and provide other benefits.

SUMMARY

Embodiments of the present disclosure process data for an artificial intelligence model across a pipeline. The pipeline comprises a first plurality of stages (e.g., a first half of the pipeline) and second plurality of stages (e.g., a second half of the pipeline). Stages in the first plurality of stages may be logically and/or physically linked to corresponding stages in the second plurality of stages. One or more of the first plurality of stages may use memory associated with a corresponding one or more of the second plurality of stages to balance memory requirements across the pipeline, for example.

BRIEF DESCRIPTION OF THE DRAWINGS

Various embodiments of the present disclosure are illustrated by way of example and not limitation in the figures of the accompanying drawings.

FIG. 4 illustrates a model parallelism pipeline with four stages and eight micro-batches according to an embodiment.

DETAILED DESCRIPTION

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident to one skilled in the art, based on the language of the different claims, that the claimed subject matter may include some or all of the features in these examples, alone or in combination, and may further include modifications and equivalents of the features and techniques described herein.

Figure 1:
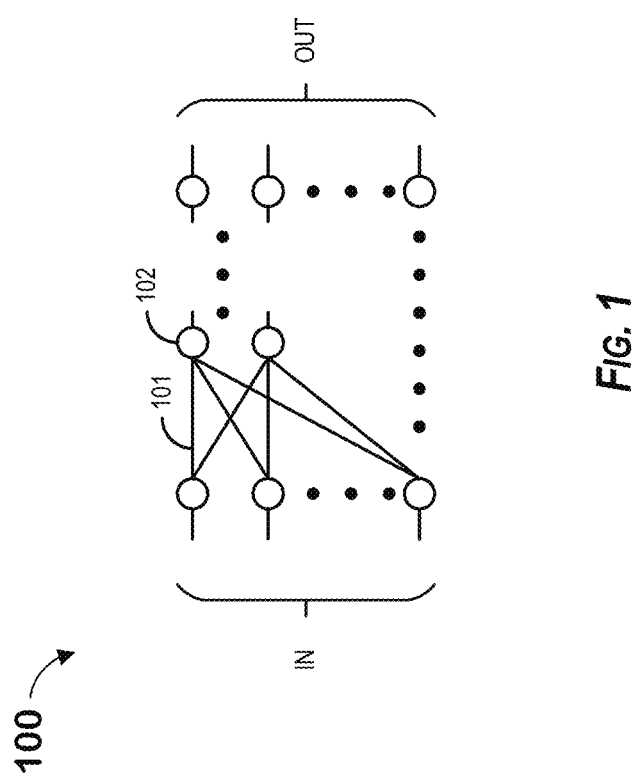
FIG. 1 illustrates a neural network.
Figure 2:
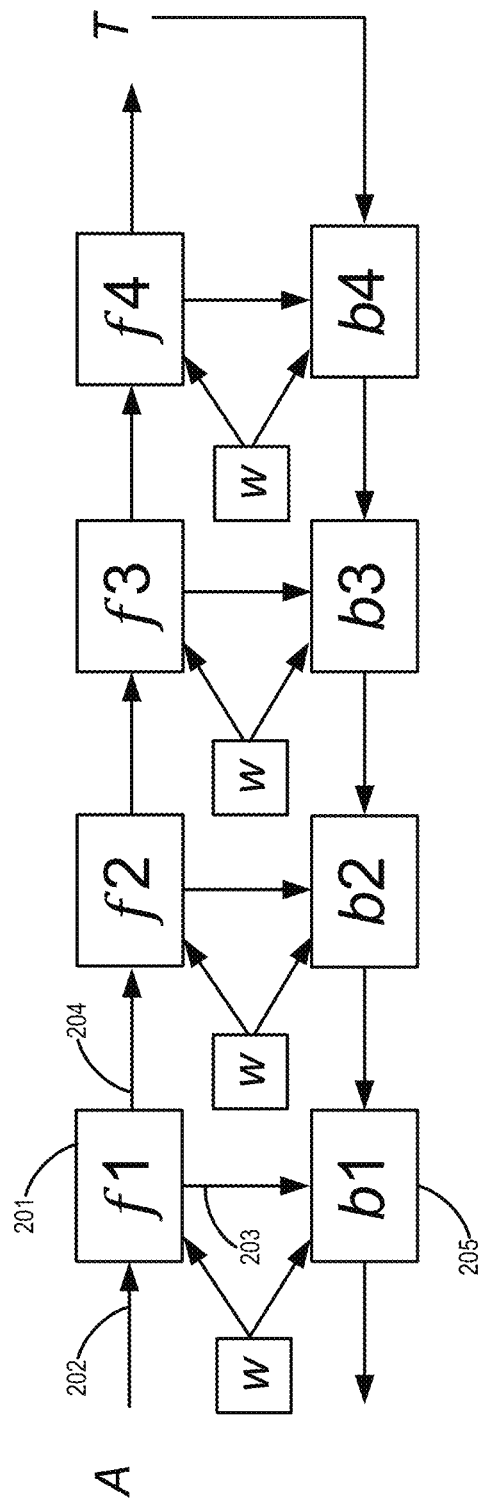
FIG. 2 illustrates training a neural network.

FIG. 2 illustrates training a neural network. In this example, four layers of a neural network are shown, including four forward operations (f1-f4) and four backward operations (b4-b1). Input data "A" is received as an input of the pipeline and is successively processed by each layer, forwards and backwards. Input data may be continuously received by the network to produce a stream of output results. One challenge with training some neural networks is that networks with large numbers of layers require more memory. For instance, each layer may be required to store activations to be able to perform backpropagation. For example, as shown in FIG. 2, the first forward operation (f1) 201 receives input 202 and determines intermediate activations 203 (referred to as "activations" herein) based on the input 202, and outputs an output activation 204 (referred to as "outputs" herein) to the second forward operation (f2). The output activation may be referred to as a tensor. As shown in FIG. 2, the intermediate activations 203 may be used by the corresponding backward operation (b1) 205. The backwards operations may include one or more operations generated using the forward operation with auto differentiation, for example. Accordingly, the intermediate activations may be stashed (e.g., stored in a buffer) until the corresponding backward operation (B1) 205 is commenced, after all of the other intermediate forward and backward operations are performed.

Activation functions are mathematical equations that determine the output of a neural network. Activations sometimes refers to the values of the weights, for example, that produced a particular output at a particular time. Data may be flowing through the network continuously, and weights may be changing, and thus activations at particular times may be stored. In this example, the first layer (or stage) of a four layer network may be required to store 4 activations required for backpropagation. For instance, consider the neural network shown in FIG. 2. Each layer may only be executed when its inputs have been produced. This means that the order of execution of all layers would be: f1, f2, f3, f4 in the forward direction and b4, b3, b2, b1 for backpropagation. As a result of execution, layer f1 produces a tensor T1. T1 may be live (e.g., stored in a memory or buffer) from its creation until the execution of b1, which may require T1 during backpropagation. In addition, layers f2, f3 and f4 may produce tensors T2, T3 and T4, respectively. Then, for example, after f4 has been executed, tensors T1, T2, T3, and T4 are live in memory and available for backpropagation. During backpropagation each tensor is used for processing. After b2 has been executed, the only tensor live in memory from T1-T4 may be T1, because tensors T4, T3 and T2 are no longer needed (have already been consumed) and may be freed from memory, for example.

Figure 4:
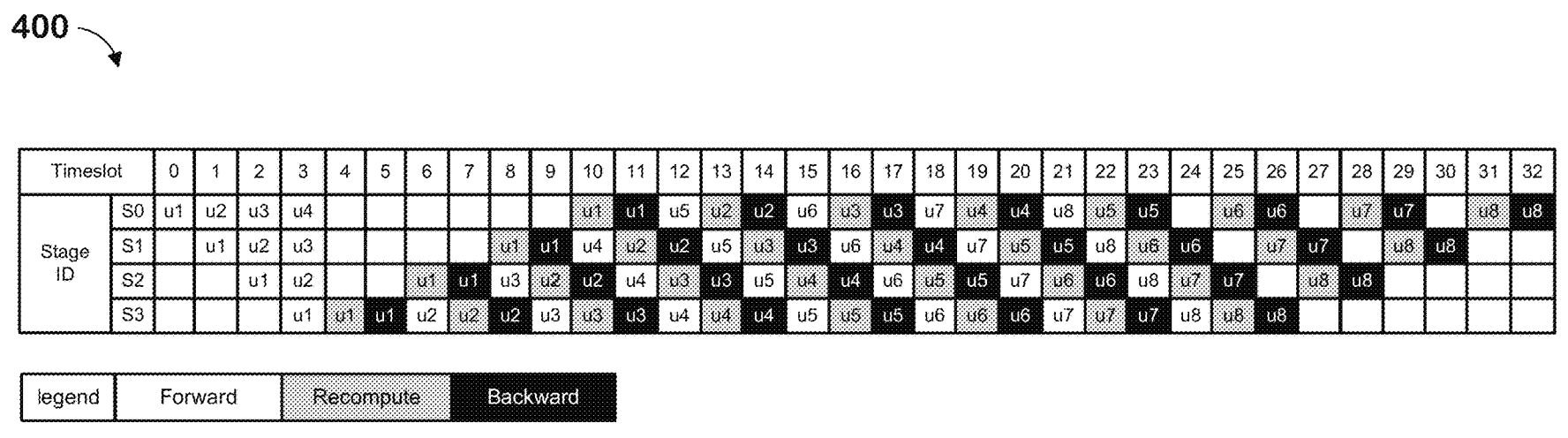

In an embodiment where multiple micro-batches are scheduled in parallel (e.g., as shown below in FIG. 4), space may be needed to stash multiple instances of these tensors. For example, referring to FIG. 4, stage S0 may execute forward layer f1; stage S1 may execute forward layer f2; stage S2 may execute forward layer f3, and stage S3 may execute forward layer f4. As shown in FIG. 4, four micro-batches are scheduled during timeslots 0 to 3, and are fed to stage S0. In this case, after timeslot 3 there will be 4 instances of tensor T1 stashed in memory (one per micro-batch). Then, the respective backward operations are executed, and one of the instances of T1 can be discarded. However, when u5 is scheduled in this stage, an extra instance of T1 is stashed. Thus, in this setting we will need space for at most 4 instances of T1.

In addition, other results at intermediate outputs may be flowing through the system. For neural networks with many layers, large memories may be required.

Figure 3:
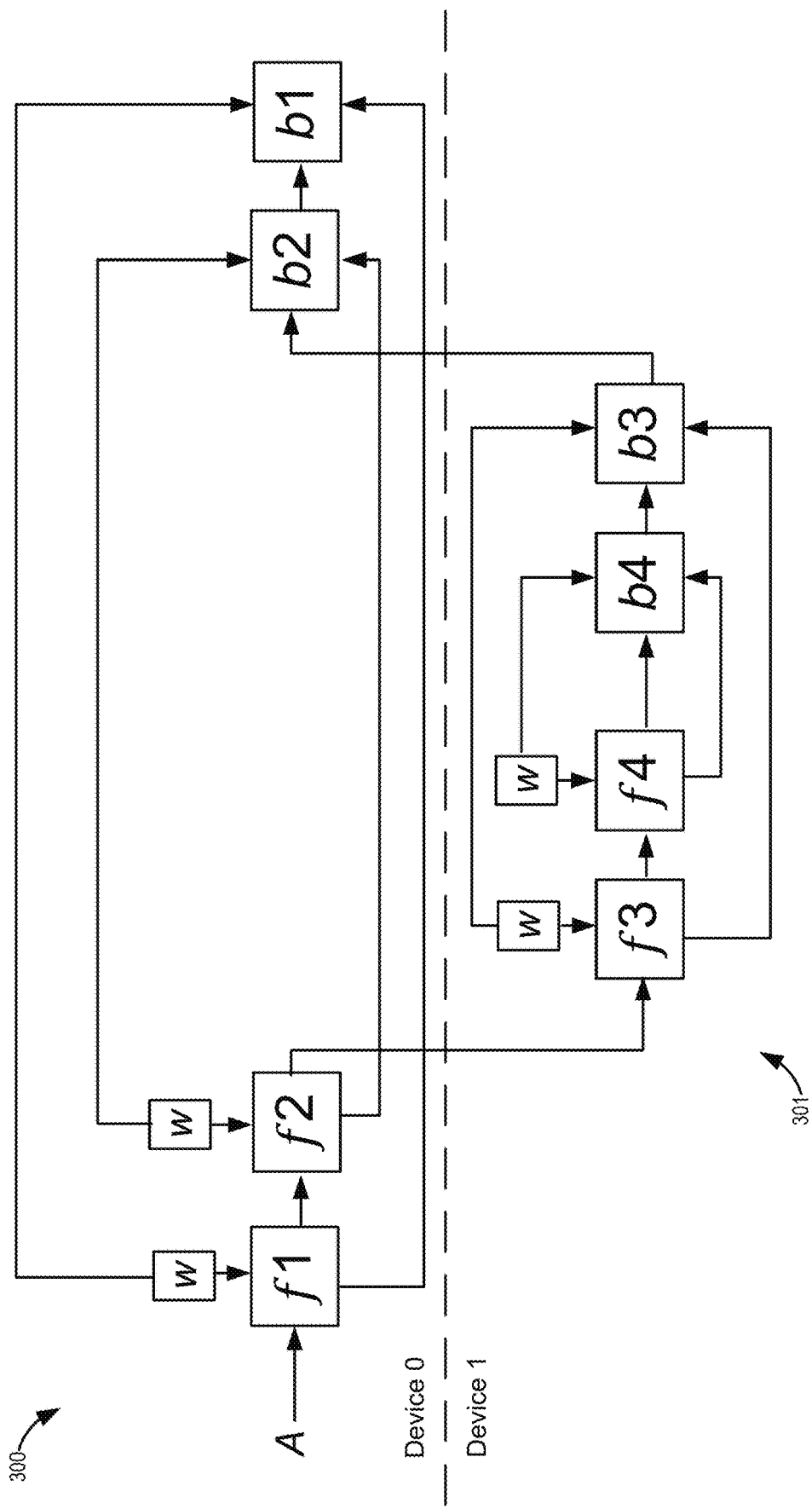
FIG. 3 illustrates training of a neural network using multiple devices according to an embodiment.

To improve efficiency, multiple devices may be used to perform training of the neural network. For instance, the neural network model may be partitioned among multiple devices. FIG. 3 illustrates training of a neural network using multiple devices according to an embodiment. As shown in FIG. 3, "Device 0" 300 performs the first forward operation (f1) and the second forward operation (f2), and the corresponding backwards operations (b2) and (b1), while another "Device 1" 301 performs the third forward operation (f3) and the fourth forward operation (f4), and the corresponding backwards operations (b4 and (b3). Advantageously, the multiple devices may perform operations in parallel as further described below.

In deep learning execution, model parallelism is a technique used to spread a model across multiple devices when it cannot fit in a single device. For example, a model that needs a minimum 40 GB can be partitioned over four processors (e.g., GPUs) with 16 GB each. One way to partition a model is to spread the stages of the network model across a linear pipeline of multiple processors, where each processor executes one or more stages of the model, for example. To improve performance using model parallelism during training, data is sent through the pipeline in "micro-batches" in the forward pass (e.g., inference) so that each stage is simultaneously handling a different micro-batch when the pipeline fills up. During the backward pass (e.g., training), the micro-batches go back through the pipeline in reverse to complete the training of each micro-batch.

FIG. 4 illustrates a model parallelism pipeline 400 with four stages and eight micro-batches according to an embodiment. Each stage S0-S3 may perform processing in parallel with the other stages in a pipeline as shown. One concern for pipelining is referred to as "stashing" or "checkpointing." When a micro-batch, say u1, goes through the forward pass for a certain stage (say, S1), the activations (e.g., intermediate activations) may be stored for u1 in S1, for use when u1 comes back to stage S1 in the backward pass, as described above with respect to FIG. 2. In some cases, all of the activations may be stored. For example, as shown in FIG. 2, stage S0 may need to stash activations for micro-batches u1, u2, u3, and u4 until timeslot "11" when the backwards pass for u1 is performed. After the backwards pass for u1, stage S0 can continue to process the forward pass for mini-batch u5 at timeslot 12 since the memory that was being used for mini-batch u1 has been freed up.

However, storing numerous activations may require more memory than is available at the particular stage. In situations where the activations would require more memory than is available, the stage may store the input instead of the activation since the input requires less storage space (e.g., 1 MB of storage for the input compared to 20 MB for the activation). In such cases, the stage may use the stashed inputs to recompute the activations during the backward pass, thereby increasing computation costs as a tradeoff for reducing storage space.

The number of activations, or input activations (for recomputing) that need to be stashed may be a function of the linear pipeline depth from the current position. For example, stage S0 may require a deeper stash than stage S1. And the last stage Sn−1 (S3 in this example) may not need to stash any activations (e.g., tensors) since the backward pass immediately follows the forward pass for each micro-batch. For example, as shown in FIG. 4, stage S3 performs the backwards pass for mini-batch u1 at timeslot 5 after the forward pass at timeslot 3 and the recompute operations at timeslot 4. Similarly, stage S3 performs the backwards pass for mini-batch u2 at timeslot 8 after the forward pass at timeslot 6 and the recompute operation at timeslot 7. Accordingly, stage S3 may not need to store activations other than those for the current mini-batch that it is processing, whereas stage S0 may need to store activations for mini-batches u1, u2, u3, and u4 until stages S3, S2, and S1 have performed their backwards pass operations on these mini-branches.

Thus, the minimum stash required for the Kth pipe stage to keep the pipeline in fully primed phase in FIG. 4 may be expressed as: $(N-K)*A$, where A is the total size of activations that need to be stashed, N is the number of pipe stages, and K is the stage id. For example, S0 has a maximum stash of $N*A$ while Sn−1 (e.g., stage S3) has a stash of 0, as discussed above. This situation may lead to severe memory imbalance across stages. For example, stage S1 may require at least a stash size of $(4-1)*A=3*A$ (i.e., 3 instances of all activations that need to be stashed). This is because it needs to stash the activations resulting from executing the forward pass with micro-batches u1, u2 and u3. After that, before executing the forward pass of each new micro-batch, it may execute the backward pass of some other micro-batch (e.g., timeslots 8, 9 and 10 for this stage), removing activations of size A before it stores new activations of size A.

The minimum space required for any stage may also depends on the schedule of computation used. For example, scheduling the mini-batches to be processed in a different order may require even larger stash requirements. Generally, the earlier stages (e.g., devices) may require much more storage space for activations compared to later stages. This memory imbalance across stages may lead to reduced efficiency as a stage cannot continue performing new forward operations if it does not have sufficient memory to store the activation (intermediate or input).

Features and advantages of the present disclosure include stash balancing across stages to improve efficiency in training the neural network. By balancing the stash across the stages, the earlier stages do not fill their memory and are able to continue processing new mini-batches. With more memory available in earlier stages, those stages may not need to wait for an input to be able to perform a backwards pass in order to free an activation from memory. Accordingly, overall efficiency of training is improved.

Stash balancing may be achieved by recognizing that different pipe stages have different stashing requirements and managing storage of the activations such that all pipe stages are balanced on memory for maximum performance and efficiency.

Figure 5:
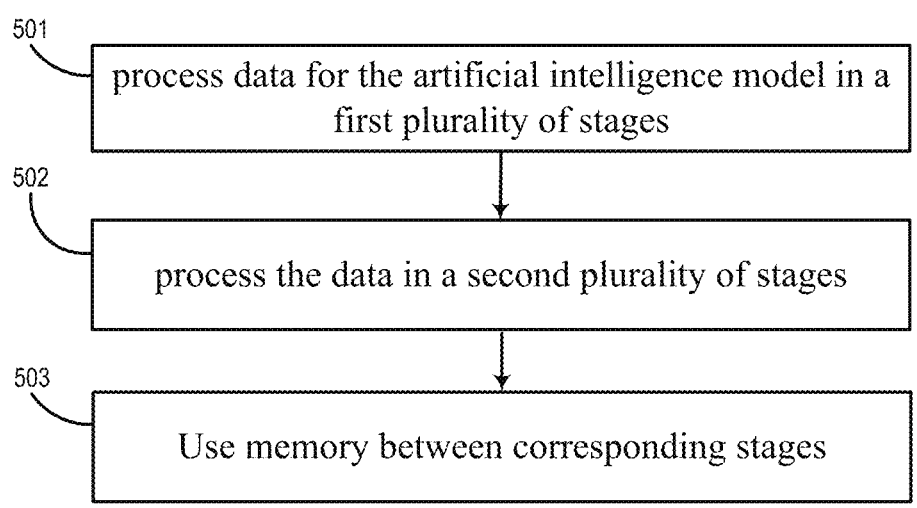
FIG. 5 illustrates a method of using an artificial intelligence model according to an embodiment.

FIG. 5 illustrates a method of using an artificial intelligence model. At 501, the method includes processing data for the artificial intelligence model in a first plurality of stages, such as a first half of the stages of a pipeline, for example. At 502, the method includes processing the data in a second plurality of stages, such as a second half of the stages of a pipeline, for example. The first and second pluralities of stages forming the pipeline. At 503, one or more of the first plurality of stages use at least one memory associated with a corresponding one or more of the second plurality of stages.

In some embodiments, the at least one memory for each of the one or more first plurality of stage and corresponding one or more second plurality of stages is approximately constant.

In some embodiments, each stage of the first plurality of stages uses memory associated with a corresponding stage of the second plurality of stages. A number of stages in the pipeline between a first stage in the pipeline and the stage may be the same number as the number of stages in the pipeline between the corresponding stage and a last stage in the pipeline. In such embodiments, the stage of the first plurality of stages may be configured on a same processor as the corresponding stage of the second plurality of stages. In such embodiments, the stage of the first plurality of stages may be configured on a processor and the corresponding stage of the second plurality of stages may configured on a corresponding processor where the processor uses memory associated with the corresponding processor.

In some embodiments, the one or more of the first plurality of stages are processed by one or more first devices and the one or more of the second plurality of stages are processed by one or more second devices. In such embodiments, one or more first devices may store data on memory of the one or more second devices. In such embodiments, each of the one or more first devices may store data on memory of a corresponding second device of the one or more second devices (e.g., after completing a forward-pass operation). Additionally, each of the one or more first devices may retrieve the data from the memory of the corresponding second device (e.g., before initiating a backwards-pass operation).

Figure 6:
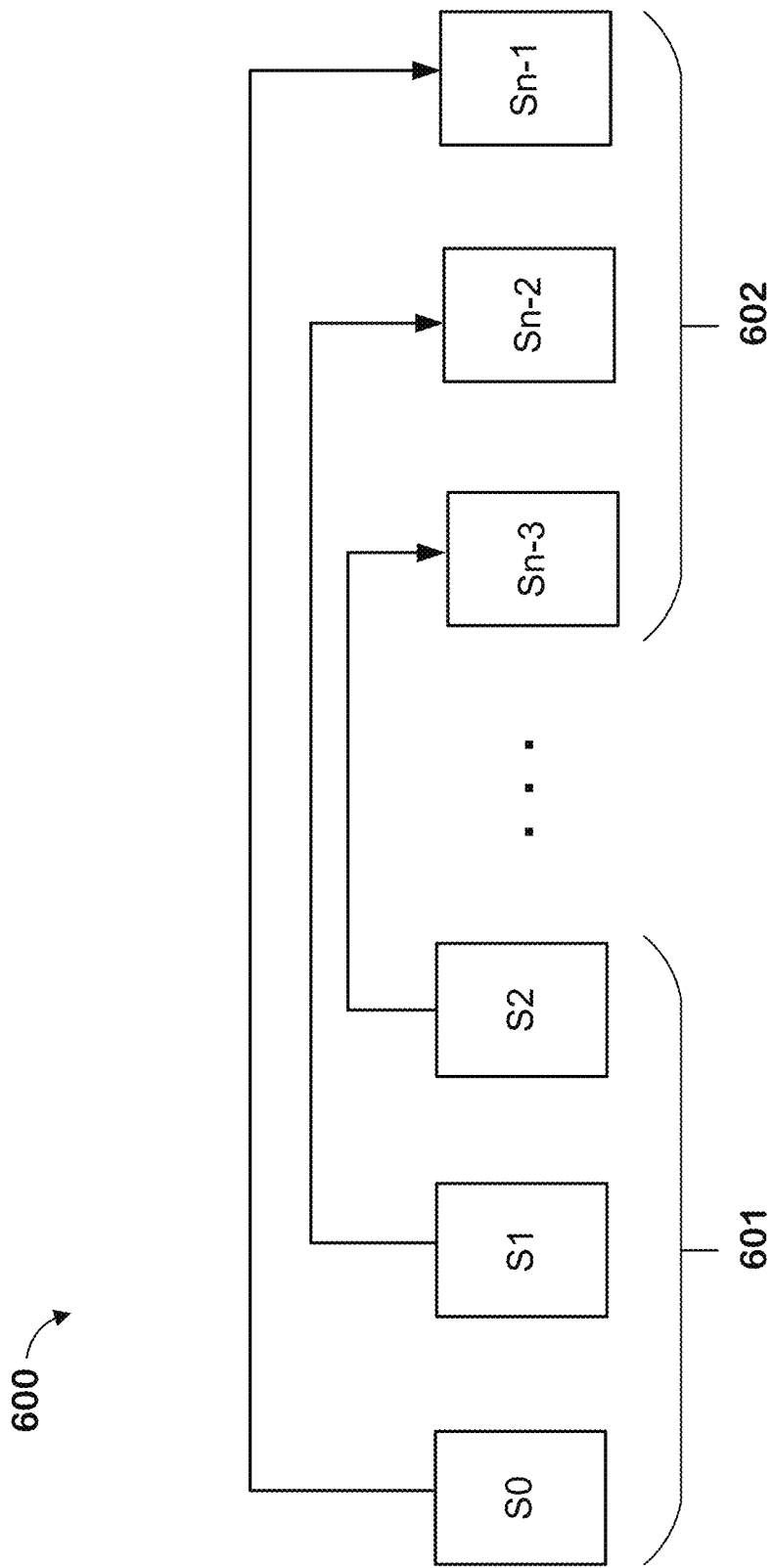
FIG. 6 illustrates stash balancing according to an embodiment.

FIG. 6 illustrates stash balancing 600 according to an embodiment. In this embodiment, the stages may each correspond to contiguous layers of the neural network. As shown in FIG. 6, the first stage S0 may send activations to be stored in the last stage Sn−1 since the first stage S0 may store more activations than the last stage Sn−1. As discussed above with respect to FIG. 4, the first stage S0 may need to store 4 activations while the last stage S3 does not need to stash activations since it can immediately perform the backwards pass (and any recompute operations) on the current mini-batch.

In some embodiments, the stages may be physically mapped such that the stash of stage K can be used (e.g., shared) by stage (N−K). That is, the first stage S0 uses memory associated with last stage Sn−1, S1 uses memory associated with Sn−2, and so forth. For example, the activation may be sent from the earlier stage to the later stage to be stored (e.g., in a memory buffer of the device/stage). In embodiments that have an odd number of stages in the pipeline, the central stage may not store activations using another other stage or store activations for any other stage.

Advantageously, this balances the stash and enables the compiler to maximize performance by minimizing the stages and the allocation of memory.

The minimum stashing requirements for the first half of the pipeline (e.g., from S0 to Sn/2) may be determined as follows:

For stage K (for K<N/2), the stash is =(N−k)*A.
Stage K sends ((N−k)−N/2)*A to stage N−K. The transfer is (N/2−k)*A.
Stage K now holds only (N/2)*A which is independent of the stage.

The minimum stashing requirements are similar for the second half of the pipeline (e.g., SN/2 to SN−1).

Stage N−K has original stash of k*A. Adding stage K's stash, buffer becomes k*A+(N/2−k)*A. This would bring it to (N/2)*A.

Advantageously, example embodiments of this technique may balance the stash so that it is constant for every pipe stage.

Figure 7:
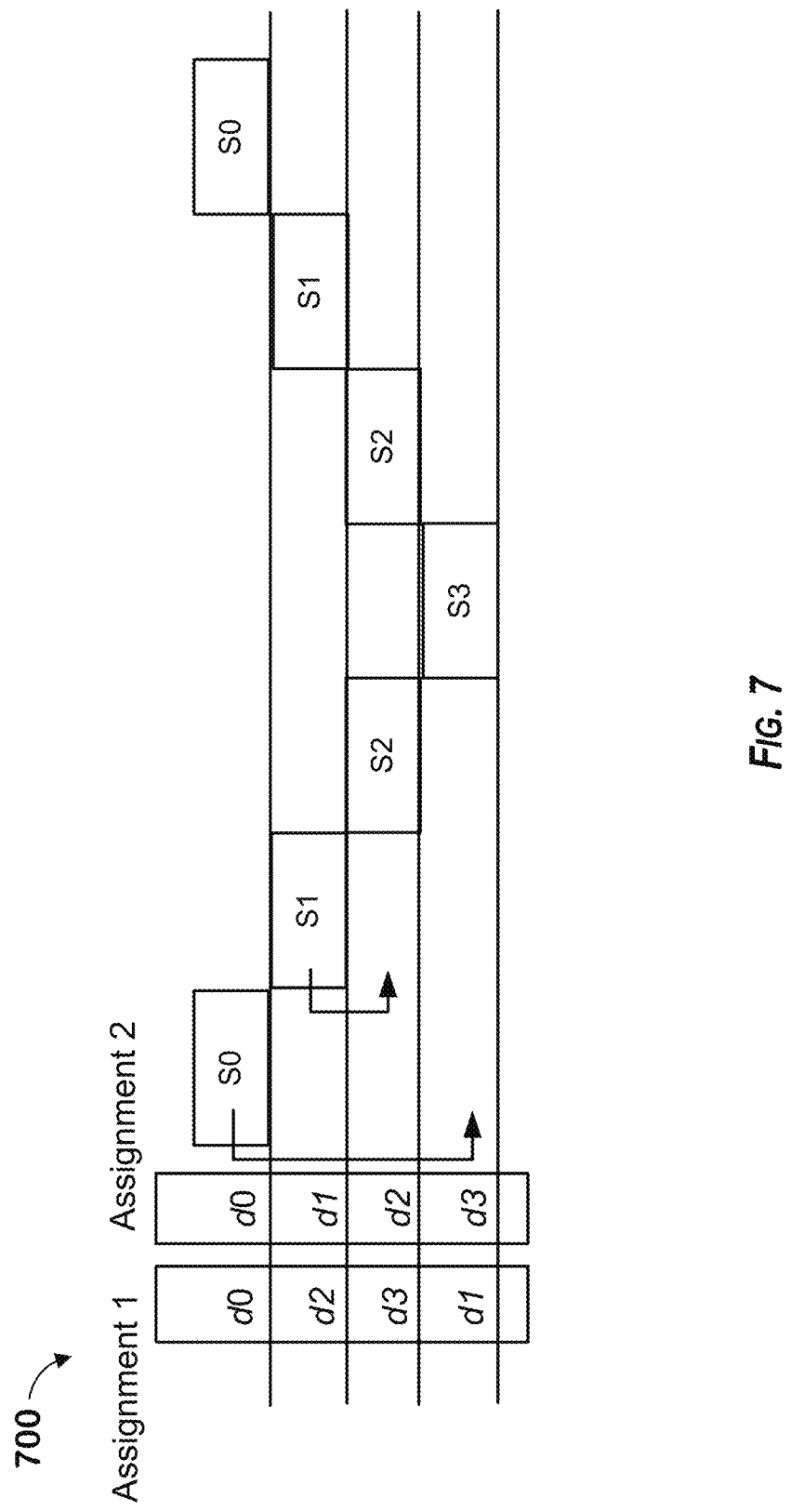
FIG. 7 illustrates two possible assignment of stages to devices according to an embodiment.

The efficiency provided by stash balancing may be further improved by assigning stages to particular devices based on bandwidths between the devices. FIG. 7 illustrates two possible assignments 700 of stages to devices according to an embodiment. The assignment of stages to devices may be set to reduce the possibility of stashing and restoring causing a bottleneck. For instance, a stage s that stages activations in a stage s' may benefit if assigned to a device of close proximity to that of s', where the bandwidth is likely to be higher than if it was farther apart. For example, table 1 below shows bandwidths between devices (where x is some positive numbers):

TABLE 1

| Bandwidth (GB/s) | $d_0$ | $d_1$ | $d_2$ | $d_3$ |
| --- | --- | --- | --- | --- |
| $d_0$ | ∅ | x | 2x | 2x |
| $d_1$ | x | ∅ | 2x | 2x |
| $d_2$ | 2x | 2x | ∅ | x |
| $d_3$ | 2x | 2x | x | ∅ |

According to Table 1, the stages may be assigned as shown in FIG. 7 using an assignment algorithm. The input to the algorithm is D, the set of devices, where D={$d_0$, . . . , $d_{N-1}$}, and S as the set stages, where S={$s_0$, . . . , $s_{N-1}$}. In this embodiment, the number of stages is the same as the number of devices. T is the set of activations (e.g., tensors) being used and produced by the neural network. Some of these activations may be stashed, and some may be recomputed, as described above. Another input is a map BStash that given a tensor t and a stage s returns 1 if there is an operation assigned to stage s that stashes the tensor t in stage N−1−s. This is defined as follows:

$B\text{Stash}(t,s) \in \{0,1\}, \forall t \in T, \forall s \in S.$

Finally, the function Cost($d_1$, $d_2$) returns the cost of an operation in device $d_1$ writing to device $d_2$, and may be derived from the device-to-device bandwidth measured in the network of devices (e.g., as shown in Table 1 above).

Given this, assignment algorithm calculates the assignment of stages to devices that minimizes the overall cost of stashing all the tensors. This may be done using a constraint solver to find the values of the variables:

deviceof($s$)∈$D$, ∀$s$∈$S$, that minimizes:

$\Sigma_{s \in S, t \in T}$BStash($t,s$)·Size($t$)·Cost(deviceof($s$), deviceof($N-s-1$))

Where Size ($t$) simply returns the size in bytes of a tensor t.

This cost function may not assume a fixed amount of data being stashed in other stages. Instead, it allows for a fine-grained decision on each tensor. Also, the assignment algorithm may not account for the cost of retrieving stashed tensors. This is because retrieving may be symmetric to stashing. That is, if stage $s_k$ stashes some tensors in stage $s_{N-k-1}$ then it may also have to retrieve the tensors from that same stage. If assuming that stashing and retrieving have identical bandwidths, if an assignment is beneficial for stashing, then it is also beneficial for retrieving. The Cost($d_1$, $d_2$) function may also assume that there is no sharing of bandwidth (i.e., there may not be multiple threads stashing to the same device at the same time).

Furthermore, the activation to stash may be sent to the other device (stage) after the forward pass is performed and the activation may be retrieved when the micro-batch commences its backward phase. The timing of when to send or retrieve the activation to/from the other stage may be based on how to hide the latency of transferring the stash especially for retrieval. If the retrieval has to begin early (e.g., due to low bandwidth), the stashing size may correspondingly be higher than the evaluations for minimum given in the equations above.

Figure 8:
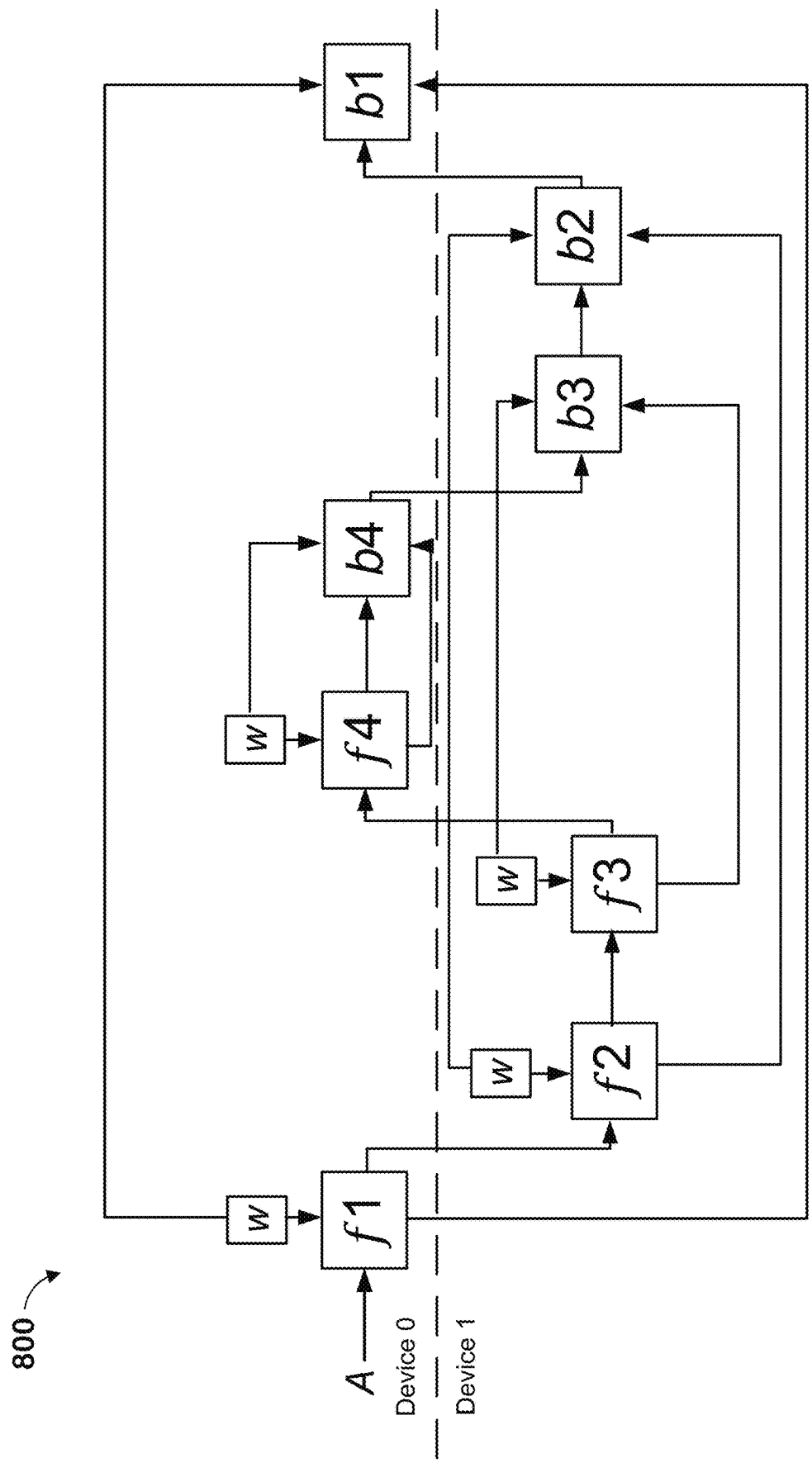
FIG. 8 illustrates training of a neural network using multiple devices according to another embodiment.

As mentioned above, in some embodiments each stage may include discontinuous layers of the neural network. FIG. 8 illustrates training of a neural network using multiple devices according to another embodiment. In this example, Device 0 performs forwards and backwards operations for the first layer (f1, b1) and the fourth (last) layer (f4, b4) while device 1 performs forwards and backwards operations for the second layer (f2, b2) and the third layer (f3, b3). In this embodiment, the stage is said to comprise discontiguous layers since the Device 0 performs the first forward pass operation and the last forward pass operations with Device 1 performing the other forward pass operations in between. This technique achieves stash balancing as the last stage f4 can immediately perform the backwards pass b4 without stashing, thereby offsetting the stash requirements of the first layer. This technique enables stash balancing through assignment of particular layers to particular devices and achieves the advantages of stash balancing described above.

Figure 9:
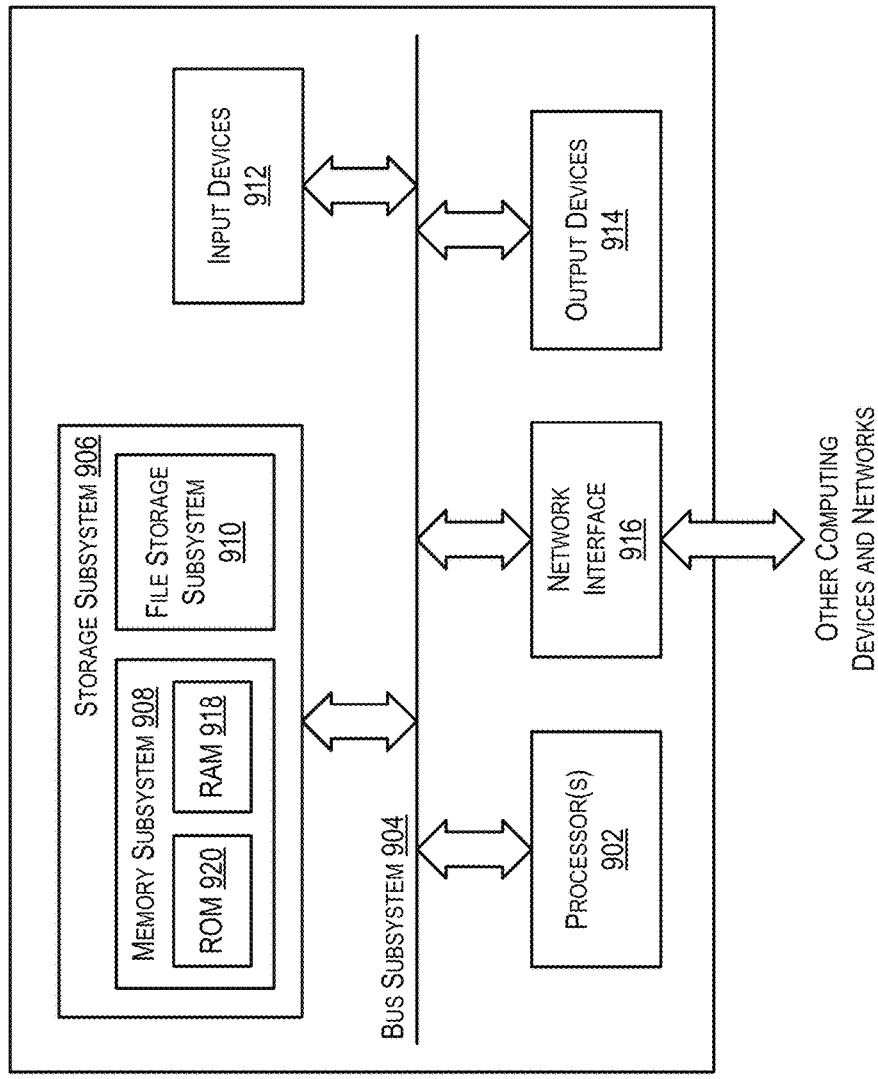
FIG. 9 depicts a simplified block diagram of an example computer system according to certain embodiments.

The techniques describe above may be implemented in a wide range of computer systems configured to process neural networks. FIG. 9 depicts a simplified block diagram of an example computer system 900, which can be used to implement the techniques described in the foregoing disclosure. As shown in FIG. 9, computer system 900 includes one or more processors 902 that communicate with a number of peripheral devices via a bus subsystem 904. These peripheral devices may include a storage subsystem 906 (e.g., comprising a memory subsystem 908 and a file storage subsystem 910) and a network interface subsystem 916. Some computer systems may further include user interface input devices 912 and/or user interface output devices 914.

Bus subsystem 904 can provide a mechanism for letting the various components and subsystems of computer system 900 communicate with each other as intended. Although bus subsystem 904 is shown schematically as a single bus, alternative embodiments of the bus subsystem can utilize multiple busses.

Network interface subsystem 916 can serve as an interface for communicating data between computer system 900 and other computer systems or networks. Embodiments of network interface subsystem 916 can include, e.g., Ethernet, a Wi-Fi and/or cellular adapter, a modem (telephone, satellite, cable, ISDN, etc.), digital subscriber line (DSL) units, and/or the like.

Storage subsystem 906 includes a memory subsystem 908 and a file/disk storage subsystem 910. Subsystems 908 and 910 as well as other memories described herein are examples of non-transitory computer-readable storage media that can store executable program code and/or data that provide the functionality of embodiments of the present disclosure.

Memory subsystem 908 includes a number of memories including a main random access memory (RAM) 918 for storage of instructions and data during program execution and a read-only memory (ROM) 920 in which fixed instructions are stored. File storage subsystem 910 can provide persistent (e.g., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 900 is illustrative and many other configurations having more or fewer components than system 900 are possible.

Figure 10:
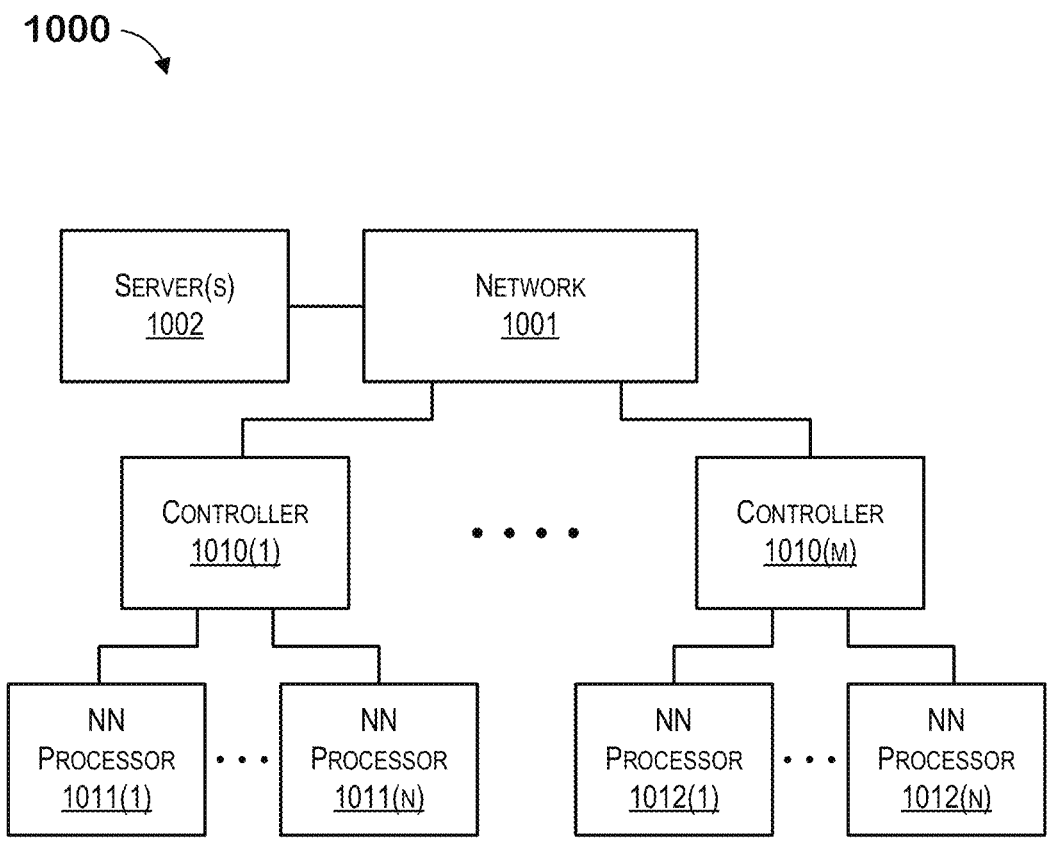
FIG. 10 illustrates a neural network processing system according to some embodiments.

FIG. 10 illustrates a neural network processing system according to some embodiments. In various embodiments, neural networks according to the present disclosure may be implemented and trained in a hardware environment comprising one or more neural network processors. A neural network processor may refer to various graphics processing units (GPU) (e.g., a GPU for processing neural networks produced by Nvidia Corp®), field programmable gate arrays (FPGA) (e.g., FPGAs for processing neural networks produced by Xilinx®), or a variety of application specific integrated circuits (ASICs) or neural network processors comprising hardware architectures optimized for neural network computations, for example.

In this example environment, one or more servers 1002, which may comprise architectures illustrated in FIG. 9 above, may be coupled to a plurality of controllers 1010(1)-1010(M) over a communication network 1001 (e.g. switches, routers, etc.). Controllers 1010(1)-1010(M) may also comprise architectures illustrated in FIG. 9 above. Each controller 1010(1)-1010(M) may be coupled to one or more NN processors, such as processors 1011(1)-1011(N) and 1012(1)-1012(N), for example. NN processors 1011(1)-1011(N) and 1012(1)-1012(N) may include a variety of configurations of functional processing blocks and memory optimized for neural network processing, such as training or inference. The NN processors are optimized for neural network computations. Server 1002 may configure controllers 1010 with NN models as well as input data to the models, which may be loaded and executed by NN processors 1011(1)-1011(N) and 1012(1)-1012(N) in parallel, for example. Models may include layers and associated weights as described above, for example. NN processors may load the models and apply the inputs to produce output results. NN processors may also implement training algorithms described herein, for example.

Further Example Embodiments

In various embodiments, the present disclosure includes systems, methods, and apparatuses for neural network training.

In one embodiment, the present disclosure includes a method of processing an artificial intelligence model comprising: processing data for the artificial intelligence model in a first plurality of stages; and processing the data in a second plurality of stages, wherein the first and second pluralities of stages form a pipeline, wherein one or more of the first plurality of stages use at least one memory associated with a corresponding one or more of the second plurality of stages.

In another embodiment, the present disclosure includes a computer system comprising: one or more processors; and a non-transitory computer readable storage medium coupled to the one or more processors and having stored thereon program code executable by the one or more processors to: process data for an artificial intelligence model in a first plurality of stages; and process the data in a second plurality of stages, wherein the first and second pluralities of stages form a pipeline; wherein one or more of the first plurality of stages use at least one memory associated with a corresponding one or more of the second plurality of stages to balance memory usage across the pipeline.

In another embodiment, the present disclosure includes a non-transitory computer readable storage medium having stored thereon program code executable by a computer system, the program code causing the computer system to: process data for an artificial intelligence model in a first plurality of stages; and process the data in a second plurality of stages, wherein the first and second pluralities of stages form a pipeline, wherein one or more of the first plurality of stages use at least one memory associated with a corresponding one or more of the second plurality of stages.

In one embodiment, usage of memory for each of the one or more first plurality of stages and corresponding one or more second plurality of stages is approximately constant.

In one embodiment, a number of stages in the pipeline between a first stage in the pipeline and a particular stage sharing memory is the same as a number of stages in the pipeline between a corresponding stage sharing memory with the particular stage and a last stage in the pipeline.

In one embodiment, the one or more of the first plurality of stages are configured on a same processor as the corresponding one or more of the second plurality of stages.

In one embodiment, the one or more stages of the first plurality of stages are configured on one or more first processors and the one or more second stages of the second plurality of stages are configured on one or more second processors, wherein the first processors use memory on the second processors.

In one embodiment, corresponding stages of the first plurality of stages and second plurality of stages use approximately the same amount of memory across the pipeline.

In one embodiment, the one or more of the first plurality of stages are configured in close proximity to the corresponding one or more of the second plurality of stages to increase a bandwidth between stages that use memory associated with corresponding stage.

In one embodiment, the one or more first plurality of stages and the corresponding one or more second plurality of stages stores data to the at least one memory after completing a forward-pass operation and retrieves the data from the at least one memory before initiating a backwards-pass operation.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations, and equivalents may be employed without departing from the scope of the present disclosure as defined by the claims.

What is claimed is:

1. A computer system comprising:
one or more processors;
a plurality of memories allocated among different stages of an N stage pipeline; and
a non-transitory computer readable storage medium coupled to the one or more processors and having stored thereon program code executable by the one or more processors to:
process data for an artificial intelligence model in a first plurality of stages; and
process the data in a second plurality of stages after the first plurality of stages, wherein the first and second pluralities of stages form the N stage pipeline;
and wherein memory-sharing stage pairs are created by pairing each stage in the first plurality of stages of the N stage pipeline with a corresponding stage in the second plurality of stages of the N stage pipeline, wherein stages assigned to a same one of the memory-sharing stage pairs are configured to store activations in a same memory of the plurality of memories and while stages assigned to different of the memory-sharing stage pairs store activations in different memories of the plurality of memories such that a total memory utilized to store activations generated by the different stages of the N stage pipeline is equally divided among the plurality of memories.

2. The computer system of claim 1 wherein one or more of the first plurality of stages are configured on a same processor as a corresponding one or more of the second plurality of stages.

3. The computer system of claim 1 wherein one or more stages of the first plurality of stages are configured on one or more first processors and one or more second stages of the second plurality of stages are configured on one or more second processors, wherein the first processors use memory on the second processors.

4. The computer system of claim 1 wherein one or more of the first plurality of stages and a corresponding one or more of the second plurality of stages store data to the memory associated with the corresponding one or more of the second plurality of stages after completing a forward-pass operation and retrieves the data from the memory associated with the corresponding one or more of the second plurality of stages before initiating a backwards-pass operation.

5. A method of processing an artificial intelligence model comprising:

processing data for the artificial intelligence model in a first plurality of stages allocated different memories of a plurality of memories; and processing the data in a second plurality of stages after the first plurality of stages,
wherein the first and second pluralities of stages form an N stage pipeline,
wherein memory-sharing stage pairs are created by pairing each stage in the first plurality of stages of the N stage pipeline with a corresponding stage in the second plurality of stages of the N stage pipeline, wherein stages assigned to a same one of the memory-sharing stage pairs are configured to store activations in a same memory of a plurality of memories and stages assigned to different of the memory-sharing stage pairs store activations in different memories of the plurality of memories such that a total memory utilized to store activations generated by different stages of the N stage pipeline is equally divided among the plurality of memories allocated to the different stages of the N stage pipeline.

6. The method of claim 5 wherein one or more of the first plurality of stages are configured on a same processor as a corresponding one or more of the second plurality of stages.

7. The method of claim 5 wherein one or more stages of the first plurality of stages are configured on one or more first processors and one or more second stages of the second plurality of stages are configured on one or more second processors, wherein the first processors use memory on the second processors.

8. The method of claim 5 wherein one or more of the first plurality of stages and a corresponding one or more of the second plurality of stages store data to the memory associated with the corresponding one or more of the second plurality of stages after completing a forward-pass operation and retrieves the data from the memory associated with the corresponding one or more of the second plurality of stages before initiating a backwards-pass operation.

9. A non-transitory computer readable storage medium having stored thereon program code executable by a computer system, the program code causing the computer system to:

process data for an artificial intelligence model in a first plurality of stages allocated different memories of a plurality of memories; and process the data in a second plurality of stages after the first plurality of stages, wherein the first and second pluralities of stages form an N stage pipeline,
wherein memory-sharing stage pairs are created by pairing each stage in the first plurality of stages of the N stage pipeline with a corresponding stage in the second plurality of stages of the N stage pipeline, wherein stages assigned to a same one of the memory-sharing stage pairs are configured to store activations in a same memory of the plurality of memories and stages assigned to different of the memory-sharing stage pairs store activations in different memories of the plurality of memories such that a total memory utilized to store activations generated by different stages of the N stage pipeline is equally divided among the plurality of memories allocated to the different stages of the N stage pipeline.

10. The non-transitory computer readable storage medium of claim 9 wherein one or more of the first plurality of stages and a corresponding one or more of the second plurality of stages store data to the memory associated with the corresponding one or more of the second plurality of stages after completing a forward-pass operation and retrieves the data from the memory associated with the corresponding one or more of the second plurality of stages before initiating a backwards-pass operation.

11. The computer system of claim 1, wherein each of the memory-sharing stage pairs comprises a Kth stage and an N–1–Kth stage of the N stage pipeline, and wherein a different one of the memory-sharing stage pairs exists for each integer value of K from 0 to N–1.

12. The method of claim 5, wherein each of the memory-sharing stage pairs comprises a Kth stage and an N–1–Kth stage of the N stage pipeline, and wherein a different one of the memory-sharing stage pairs exists for each integer value of K from 0 to N–1.

13. The non-transitory computer readable storage medium of claim 9, wherein each of the memory-sharing stage pairs comprises a Kth stage and an N–1–Kth stage of the N stage pipeline, and wherein a different one of the memory-sharing stage pairs exists for each integer value of K from 0 to N–1.

* * * * *